: 3,507,899
PRODUCTION OF N-p-BROMOPHENYL-N'-METHYL-N'-METHOXYUREA
Wolfgang Vilsmeier, Bad Durkheim, and Herbert Maisack, Ludwigshafen (Rhine), Germany, assignors to Badische Anilin- & Soda-Fabrik Aktiengesellschaft, Ludwigshafen (Rhine), Germany
No Drawing. Filed Feb. 14, 1967, Ser. No. 615,901
Claims priority, application Germany, Mar. 1, 1966, 1,568,084
Int. Cl. C07c 127/18
U.S. Cl. 260—453                                 5 Claims

ABSTRACT OF THE DISCLOSURE

An improved method for the production of N-p-bromophenyl-N'-methyl-N'-methoxyurea by reacting N-phenyl-N'-methyl-N'-methoxyurea with bromine or bromine-evolving agents, such as hypobromous acid, its salts, or N-bromosuccinimide, advantageously in equivalent amounts in the presence of inert solvents, such as concentrated acetic acid or chlorohydrocarbons, and in the absence of sodium acetate or other acid-binding agents at temperatures of 0 to 40° C. N-p-bromophenyl-N'-methyl-N'-methoxyurea is obtained in very pure form. Formulation is therefore easier; consequently the content of active ingredient in the formulated product can be increased. N-p-bromophenyl-N'-methyl-N'-methoxyurea is used as a herbicide.

---

This invention relates to an improved process for the production of N-p-bromophenyl-N'-methyl-N'-methoxyurea.

It is known from U.S. patent specification 3,223,721 that N-p-bromophenyl-N'-methyl-N'-methoxyurea can be obtained by brominating N-phenyl-N'-methyl-N'-methoxyurea. According to this prior art method, the reaction must be carried out at a temperature of about 70° C. in the presence of sodium acetate; the result is that the phenyl radical is brominated not only in the para position but also in the ortho position and that in addition dibromo compounds are formed. These impurities lower the melting point of the product. This is a disadvantage because during the formulation of the N-p-bromophenyl-N'-methyl-N'-methoxyurea with emulsifiers or dispersing agents followed by spray-drying or grinding with carrier materials the apparatus becomes encrusted, which results in disturbances. Therefore, when using the crude product, the content of active ingredient in the formulated product must be kept relatively low. A product having the desired purity can be obtained by recrystallization of the crude product, but this constitutes an additional expensive process step.

It is an object of this invention to provide a process in which N-p-bromophenyl-N'-methyl-N'-methoxyurea is obtained in a higher yield. Another object of the invention is to provide a process in which N-p-bromophenyl-N'-methyl-N'-methoxyurea is obtained in very pure form. A further object of the invention is to provide a process in which bromination of the N-phenyl-N'-methyl-N'-methoxyurea proceeds more specifically. Yet another object of the invention is to provide a process in which N-p-bromophenyl-N'-methyl-N'-methoxyurea is produced which is easier to formulate. Other objects and advantages of the invention will be evident to those skilled in the art from the following description.

In accordance with this invention these objects and advantages are achieved by reacting N-phenyl-N'-methyl-N'-methoxyurea with bromine or bromine-evolving agents in the presence of an inert solvent and in the absence of sodium acetate or other acid-binding agents at a temperature of from 0 to 40° C.

Bromination is carried out with elemental bromine or with bromine-evolving compounds. Examples of suitable bromine-evolving compounds are hypobromous acid or its salts with elements of the first and second main groups of the Periodic System and organic bromine-evolving compounds, such as N-bromosuccinimide. Elemental bromine is preferred.

N-phenyl-N'-methyl-N'-methoxyurea is obtained for example by a method described in German patent specification 1,192,184 which consists in reacting phenyl isocyanate with aqueous hydroxylamine solution followed by alkylation.

N-phenyl-N'-methyl-N'-methoxyurea and bromine or the bromine-evolving compound are advantageously reacted in equivalent amounts. In order to obtain the product substantially without contamination with by-products it is advantageous to adhere as strictly as possible to the equivalence of the amounts of the starting materials.

The reaction is carried out in the presence of a solvent which is inert under the reaction conditions. Examples of suitable solvents are concentrated acetic acid; chlorohydrocarbons, such as carbon tetrachloride and ethylene chloride; and ethers, such as dioxane. Concentrated acetic acid is preferred. It goes without saying that the solvents used should be liquid under the reaction conditions.

The reaction is carried out at a temperature of from 0 to 40° C. Particularly good results are obtained when it is carried out at a temperature between 10 and 30° C.

To accelerate the reaction, water may be added to the solvent. It is advantageous to use 1 to 30% by weight, particularly 10 to 25% by weight, with reference to the amount of solvent.

The process according to the invention may be carried out for example by placing a solvent in a stirred vessel and dissolving the N-phenyl-N'-methyl-N'-methoxyurea in it. The bromine or the bromine-evolving agent is then metered into the solution at the temperatures indicated above. The reaction is allowed to proceed to completion, e.g. in one hour, and the N-p-bromophenyl-N'-methyl-N-methoxyurea is precipitated by adding water. The reaction product is isolated by a conventional method, e.g. filtration, and dried.

N-p-bromophenyl - N' - methyl-N'-methoxyurea produced by the process according to the invention is used as a herbicide as described in U.S. patent specification 3,223,721.

The invention is further illustrated by the following example in which parts are by weight.

EXAMPLE 225 parts of glacial acetic acid and 40 parts of water are placed in a stirred vessel and 110 parts of N-phenyl-N'-methyl-N'-methoxyurea is dissolved therein, the solution cooling to 10° C. 98 parts of bromine is metered in in the course of 2 hours with stirring. The temperature of the reaction mixture is maintained at 10 to 20° C. by cooling. The reaction is allowed to proceed to completion in one hour. The N-p-bromophenyl-N'-methyl-N'-methoxyurea formed is precipitated by adding 500 parts of water and isolated by filtration. The moist product obtained is dried at 60° C. in vacuo. 150 parts (94.9% of the theory) of N-p-bromophenyl-N'-methyl-N'-methoxyurea having a melting point of 94 to 96° C. is obtained.

The N-p-bromophenyl-N'-methyl-N'-methoxyurea produced by the method described above contains particularly small amounts of by-products.

The amounts of by-products contained in the N-p-bromophenyl-N'-methyl-N'-methoxyurea prepared by the process according to this invention are compared with the amounts of by-products contained in a product prepared by the process according to U.S. patent specification 3,223,721 in the following table:

TABLE

| By-products | Process according to U.S.P. 3,223,721 | Process according to the invention |
|---|---|---|
| N-o-bromophenyl-N'-methyl-N'-methoxyurea. | 1.13% by wt | 0.21% by wt. |
| N-dibromophenyl-N'-methyl-N'-methoxyurea. | 4.22% by wt | 1.15% by wt. |

We claim:

1. In a process for the production of N-p-bromophenyl-N'-methyl-N'-methoxyurea by reacting N-phenyl-N'-methyl-N'-methoxyurea with bromine or a bromine-evolving compound in the presence of an inert solvent and in the absence of sodium acetate or other acid-binding agents, the improvement which comprises carrying out the reaction at a temperature of from 10 to 30° C.

2. A process as claimed in claim 1 wherein N-phenyl-N'-methyl-N'-methoxyurea and bromine or a bromine-evolving compound are reacted in equivalent amounts.

3. A process as claimed in claim 1 wherein elemental bromine is used.

4. A process as claimed in claim 1 wherein concentrated acetic acid is used as the solvent.

5. A process as claimed in claim 1 wherein 1–30% by weight of water, with reference to the solvent, is used.

References Cited

UNITED STATES PATENTS 3,288,851  11/1966  Martin et al. _____ 260—453

FOREIGN PATENTS 965,313  7/1964  Great Britain.
398,543  9/1965  Switzerland.
405,821  1/1966  Switzerland.

CHARLES B. PARKER, Primary Examiner

C. F. WARREN, Assistant Examiner